(12) United States Patent
Canciu et al.

(10) Patent No.: US 6,642,770 B2
(45) Date of Patent: Nov. 4, 2003

(54) MULTI-LAYER CONTROL INTERFACE FOR CLOCK SWITCHING IN A COMMUNICATIONS ELEMENT

(75) Inventors: Vintila Canciu, Westmount (CA); Luc Daniel Richard Andre Charbonneau, Montreal (CA); Giovanni Chiazzese, Pierrefonds (CA); Matthew C. Marugg, Ville Mercier (CA)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 10/163,731

(22) Filed: Jun. 6, 2002

(65) Prior Publication Data

US 2002/0186718 A1 Dec. 12, 2002

Related U.S. Application Data

(60) Provisional application No. 60/296,294, filed on Jun. 6, 2001.

(51) Int. Cl.[7] ................................................. H03K 17/62
(52) U.S. Cl. ......................... 327/407; 327/295; 327/99
(58) Field of Search ..................... 327/99, 292, 407–411

(56) References Cited

U.S. PATENT DOCUMENTS

| | | | |
|---|---|---|---|
| 4,538,272 A | 8/1985 | Edwards et al. | |
| 4,779,008 A | * 10/1988 | Kessels | 327/292 |
| 4,982,116 A | 1/1991 | Lee | |
| 5,357,491 A | 10/1994 | Yamasaki | |
| 5,502,409 A | 3/1996 | Schnizlein et al. | |
| 5,534,805 A | 7/1996 | Miyazaki et al. | |
| 5,577,075 A | 11/1996 | Cotton et al. | |
| 5,821,794 A | 10/1998 | Nazarian et al. | |
| 5,870,441 A | 2/1999 | Cotton et al. | |
| 5,875,153 A | 2/1999 | Hii et al. | |
| 5,903,616 A | 5/1999 | Rangan et al. | |
| 6,239,626 B1 | 5/2001 | Chesavage | |
| 6,260,175 B1 | 7/2001 | Basel | |
| 6,305,001 B1 | 10/2001 | Graef | |
| 6,336,190 B1 | 1/2002 | Yamagishi et al. | |
| 6,430,695 B1 | 8/2002 | Bray et al. | |

* cited by examiner

*Primary Examiner*—Kenneth B. Wells
(74) *Attorney, Agent, or Firm*—Jones Day (57) ABSTRACT

A clock system includes a provisioning layer corresponding to a plurality of input clocks, and a plurality of layers arranged according to a hierarchy. The first layer in the hierarchy is operable to arrange the input clocks into groups and for each group select a corresponding group output clock. The remaining layers in the hierarchy are operable to arrange the group output clocks from a next layer higher in the hierarchy into groups and for each group select a corresponding group output clock. The lowest layer in the hierarchy is operable to select one of the group output clocks from the next layer higher in the hierarchy as a selected clock.

30 Claims, 8 Drawing Sheets

MULTI-LAYER CONTROL INTERFACE FOR
CLOCK SWITCHING IN A
COMMUNICATIONS ELEMENT

This application claims benefit of U.S. Provisional Application No. 60/296,294, entitled "Multi-Layer Control Interface for Clock Switching in a Communications Element" which was filed on Jun. 6, 2001, the entire disclosure of which is incorporated herein by reference.

BACKGROUND

1. Field of the Invention

This invention relates generally to the field of data communications. More specifically, the invention relates to clocking schemes for use with data communications elements, such as SONET/SDH add-drop multiplexers, switches, and the like.

2. Description of the Related Art

Communication systems transmit and receive data between multiple communication devices connected to one or more networks. The networks may be either asynchronous or synchronous. A synchronous network is a network in which clocks are controlled to run, ideally, at identical rates, or at the same mean rate with a fixed relative phase displacement, within a specified limited range. Networks based on Synchronous Optical Network (SONET) and/or Synchronous Digital Hierarchy (SDH) standards are examples of synchronous networks.

Conversely, an asynchronous network is a network in which the clocks do not need to be synchronous. An Ethernet LAN is an example of an asynchronous network.

In both asynchronous and synchronous networks, multiple clocks are available for distribution and selection. Furthermore, failure of a clock or degradation of a clock signal in a communication device may cause communication errors or even catastrophic failures. Clock distribution and protection circuits provide for the selection and protection of clock signals.

SUMMARY

A clock system includes a provisioning layer corresponding to a plurality of input clocks, and a plurality of layers arranged according to a hierarchy. The first layer in the hierarchy is operable to arrange the input clocks into groups and for each group select a corresponding group output clock. The remaining layers in the hierarchy are operable to arrange the group output clocks from a next layer higher in the hierarchy into groups and for each group select a corresponding group output clock. The lowest layer in the hierarchy is operable to select one of the group output clocks from the next layer higher in the hierarchy as a selected clock.

A clock system also includes a plurality of input clocks, and a first layer operable to receive the input clocks, arrange the input clocks into first groups, and for each first group select a first group output clock from one of the input clocks in the first group. A second layer is operable to receive the first group output clocks from the first layer, arrange the first group output clocks into second groups, and for each second group select a second group output clock from one of the first group output clocks in the second group. A third layer is operable to receive the second group output clocks and select one of the second group output clocks as a selected clock.

DETAILED DESCRIPTION

A multi-layer control interface for clock switching provides a unified interface for both SONET and SDH clock switching. The multi-layer control interface controls any number of clock entities, including system clocks, derived clocks, timing signal generators, and the like. The multi-layer control interface may also include 0:1, 1:1, and m:1 protection schemes, and can be expanded to include new standards and new protection schemes. The multi-layer control interface may also include embedded line/clock protection schemes.

While the multi-layer control interface for clock switching is described in particular for use in both SONET and SDH clock switching, the multi-layer control interface may also be used in other networks and systems that use clock switching. Furthermore, the multi-layer control interface may be used for both synchronous and asynchronous clocks.

Figure 1:
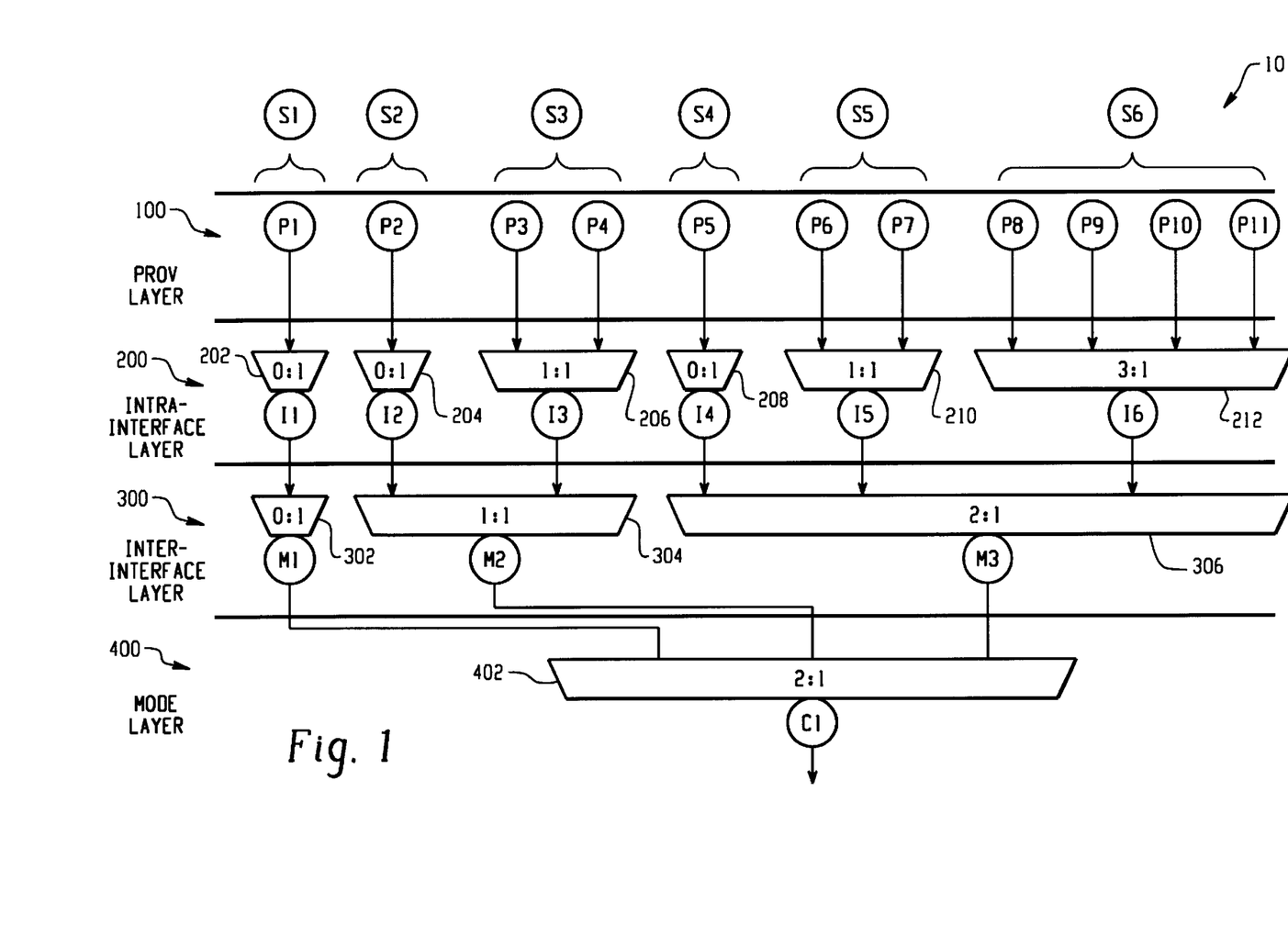
FIG. 1 is a block diagram of a multi-layer control interface for clock switching.

FIG. 1 is a block diagram of a multi-layer control interface 10 for clock switching. The multi-layer control interface 10 is illustratively used in a communication element of a network. The control interface 10 includes a plurality of layers including a provisioning layer 100, an intra-interface layer 200, an inter-interface layer 300, and a mode layer 400. The layers 100, 200, 300 and 400 correspond to a layer in an associated switch matrix. The switch matrix may be realized by using either appropriate hardware devices or software programming, or a combination of both hardware devices and software programming. The layers 100, 200, 300 and 400 are arranged according to a descending hierarchy, with the provisioning layer 100 highest in the hierarchy, and the mode layer 400 lowest in the hierarchy.

The provisioning layer 100 receives a plurality of clock sources S1–S6. Each clock source S1–S6 may be a single clock source, or may be a plurality of several clock sources. The clock sources S1–S6 are used to generate a plurality of access point clocks P1–P11 in the provisioning layer 100. The number of clock sources S1–S6 and the number of access point clocks P1–P11 are dependent on the hardware requirements of the communication element, such as the number of clock lines on a back plane of the element, the number of monitoring points, and other similar requirements.

The intra-interface layer 200 is a line protection interface in which the access point clocks P1–P11 from the provisioning layer 100 are grouped and routed to a plurality of switching elements 202, 204, 206, 208, 210 and 212. The line protection may include Linear Automatic Protection Switching (APS)/Clock protection, span protection for Bidirectional Line Switch Ring (BLSR) 4-Fiber/Clock protection, and the like. Each switching element 202–212 provides an M:1 protection scheme for group output interface clocks I1–I6. As used herein, an M:1 protection scheme means that a group output clock is protected by M+1 input clocks. Thus, each switching element 202–212 receives M+1 clock inputs, M being greater than or equal to 0, and selects a group output clock I1–I6. For example, in a protection scheme of 0:1, the group output clock is protected only by the input clock of its group; in a 2:1 protection scheme, the group output clock is protected by two additional input clocks of its group.

Each group output clock I1–I6 is one of the selected input clocks from each switching element 202–212. Illustratively, the group output clock I1 is the clock P1; and the group output clock I6 is one of the clocks P8, P9, P10, or P11. The switching elements 202–212 may be realized by multiplexers, glitchless switches, software control, or other known switching devices and methods.

The group output clocks I1–I6 are routed to the inter-interface layer 300, which groups the group output clocks I1–I6 and routes the groups to a plurality of switching elements 302, 304 and 306. Each switching element 302, 304 and 306 provides an M:1 protection scheme for their respective group output clocks M1, M2 and M3. The inter-interface layer 300 provides clock protection and switching beyond the intra-interface layer 200, such as ring protection for BLSR 4-Fiber/Clock protection. The switching elements 302, 304 and 306 may be realized by multiplexers, glitchless switches, software control, or other known switching devices and methods.

The mode layer 400 receives the group output clocks M1, M2 and M3 and routes them to a switching element 402 that outputs a selected clock C1. The switching element 402 provides a 2:1 protection scheme for the selected clock C1. The switching element 402 may be realized by multiplexers, glitchless switches, software control, or other known switching devices and methods.

Figure 2:
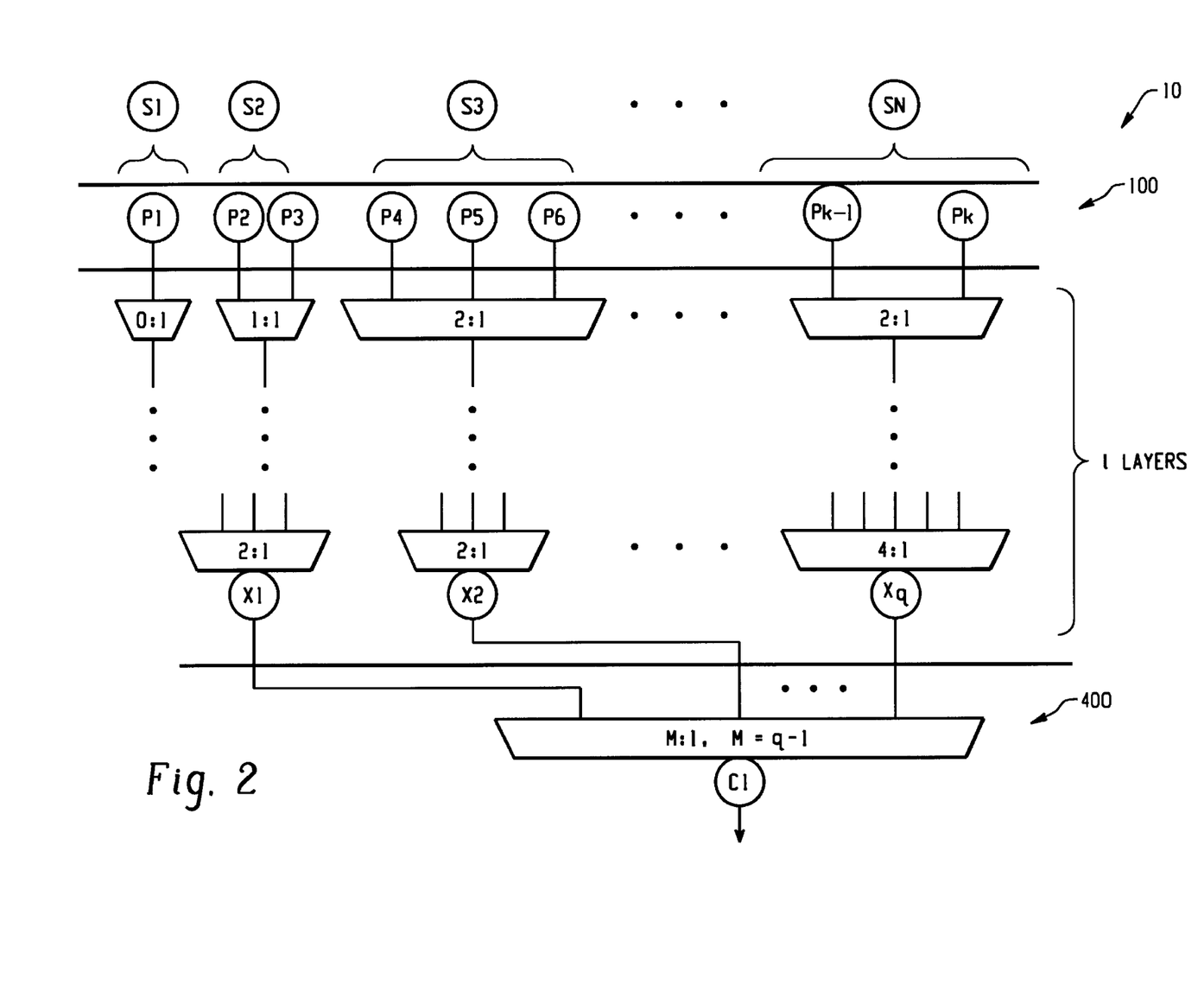
FIG. 2 is a block diagram of an expanded multi-layer control interface for clock switching.

While the block diagram of FIG. 1 depicts an embodiment comprising four layers 100, 200, 300 and 400 and providing a 2:1 protection scheme for the selected clock C1, the multi-layer control interface 10 may also be expanded to comprise a plurality of layers and provide an M:1 protection scheme for the selected clock C1. FIG. 2 is a block diagram of the multi-layer control interface 10 for clock switching having a plurality of clock sources S1–SN, and a plurality of k access point clocks P1–Pk, and ι layers between the provisioning layer 100 and the mode layer 400. The mode layer 400 receives group output clocks X1 . . . Xq. Thus, the selected clock C1 is protected by an M:1 protection scheme, M=q−1.

Each layer may provide additional features to the multi-layer control interface 10. For example, layers in the multi-layer clock control interface 10 may be arranged to provide clock selection and protection based optical clock signals and electrical clock signals. The access point clocks may provide optical clock signals and electrical clock signals. The optical clock signals and electrical clock signals may be switched separately in several layers, and converted to the same clock type (e.g., electrical or optical) in a conversion layer. Thus, an output clock may be selected from either optical or electrical clock signals of various types and protected according to an M:1 protection scheme.

In another example, layers in the multi-layer clock control interface 10 may be arranged to provide clock selection and protection based on Stratum classes, e.g., Stratum 1, Stratum 2, Stratum 3 and Stratum 3E clocks. Thus, a Stratum 1, Stratum 2, Stratum 3 or Stratum 3E clock may be selected by the user, and each Stratum 1, Stratum 2, Stratum 3 and Stratum 3E clock could be protected by one or more clocks of the same class.

Figure 3:
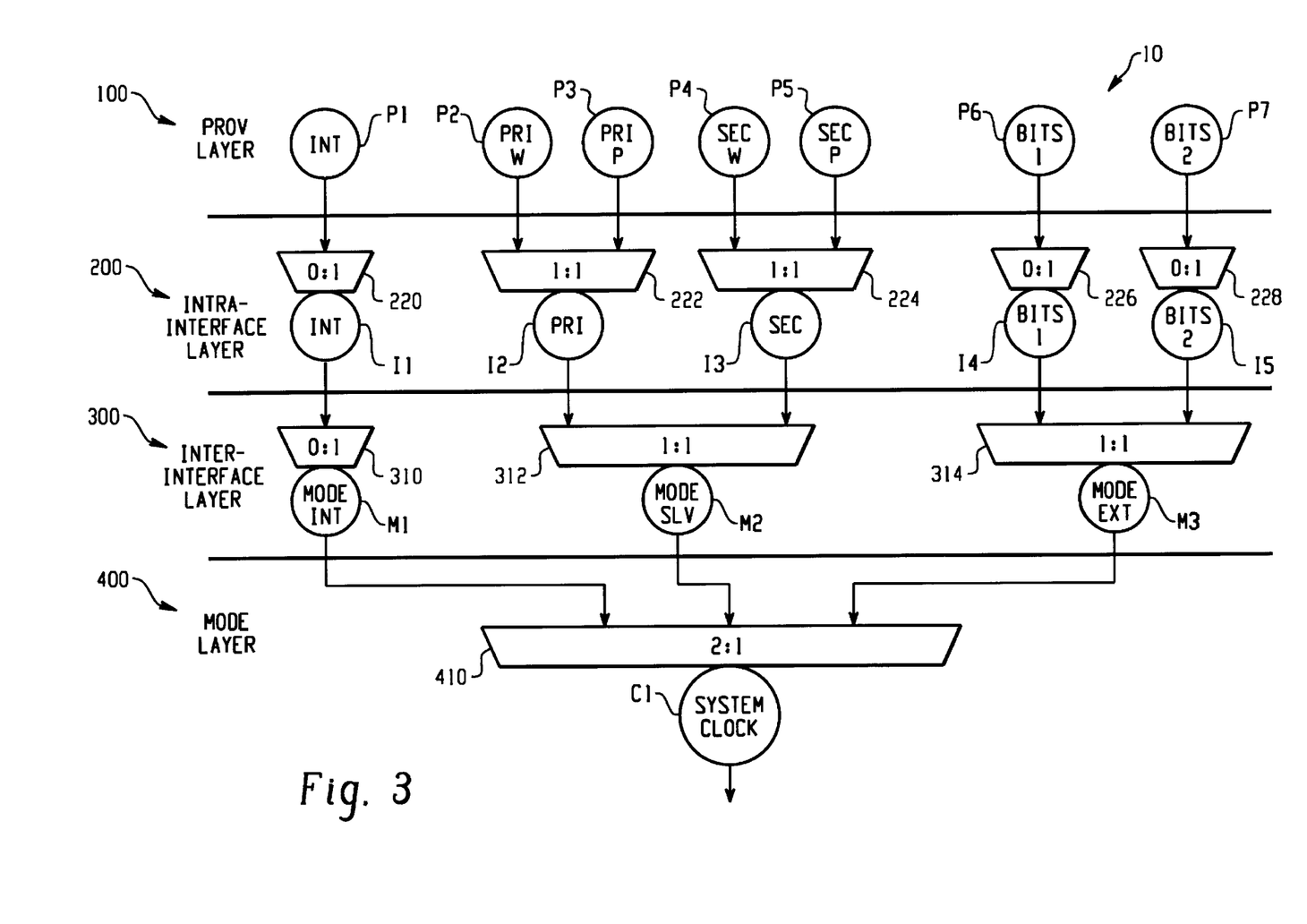
FIG. 3 is a block diagram of a multi-layer control interface in a SONET network element.

FIG. 3 depicts an embodiment of the multi-layer control interface 10 shown in FIGS. 1 and 2 in a SONET network element. The network element is illustratively an MCN-7000 Advance Multiple Services Carrie Node from Marconi Communications. In the network element, the system clock C1 is selected from among seven access point clocks provided at the provisioning clock 100—Internal P1, Primary Working P2, Primary Protection P3, Secondary Working P4, Secondary Protection P5, Building Integrated Timing Supply 1 (BITS1) P6 and BITS2 P7.

The intra-interface layer 200 provides line protection and groups the clocks P1–P7 from the provisioning layer 100 into a plurality of switching elements 220, 222, 224, 226 and 228. In this embodiment, the intra-interface layer 200 is realized at the line card level. The respective outputs of the switching element 220, 222, 224, 226 and 228 are interface clocks Internal I1, Primary I2, Secondary I3, BITS1 I4, and BITS2 I5. Thus, the selection of the corresponding group output clocks I1–I5 of the inter-interface layer 200 corresponds to clock switching between different line interfaces.

The inter-interface layer 300 receives the interface clocks I1–I6 and groups them into a plurality of switching elements 310, 312 and 314. The respective outputs of the switching elements 310, 312, and 314 are the mode clocks Internal M1, Slave M2, and External M3. The mode layer 400 receives the mode clocks M1, M2 and M3 and outputs a system clock C1 that is one of the mode clocks M1, M2 or M3 selected by a user. In this embodiment, the inter-interface layer 300 and the mode layer 400 are realized above the line card level. Thus, the selection of the corresponding group output clocks M1–M3 of the inter-interface layer 300 corresponds to clock switching between different line interfaces, and the selection of the system clock C1 of the mode layer 400 corresponds to clock switching between different timing modes.

The multi-layer control interface 10 for SONET thus supports three modes of operation: Internal clock M1, Slave clock M2, and External clock M3. The Internal clock M1 is the Internal clock I1; the Slave clock M2 is selected from one of two interface clocks Primary I2 and Secondary I3; and the External clock M3 is selected from one of two interface clocks BITS1 I4 and BITS2 I5. Thus, there are five protection schemes in excess of 0:1: two 1:1 protection schemes for the Slave clock M2 and External clock M3; two 1:1 schemes for the Primary and Secondary interface clocks I2 and I3, and one 2:1 protection scheme for the system clock C1.

Figure 4:
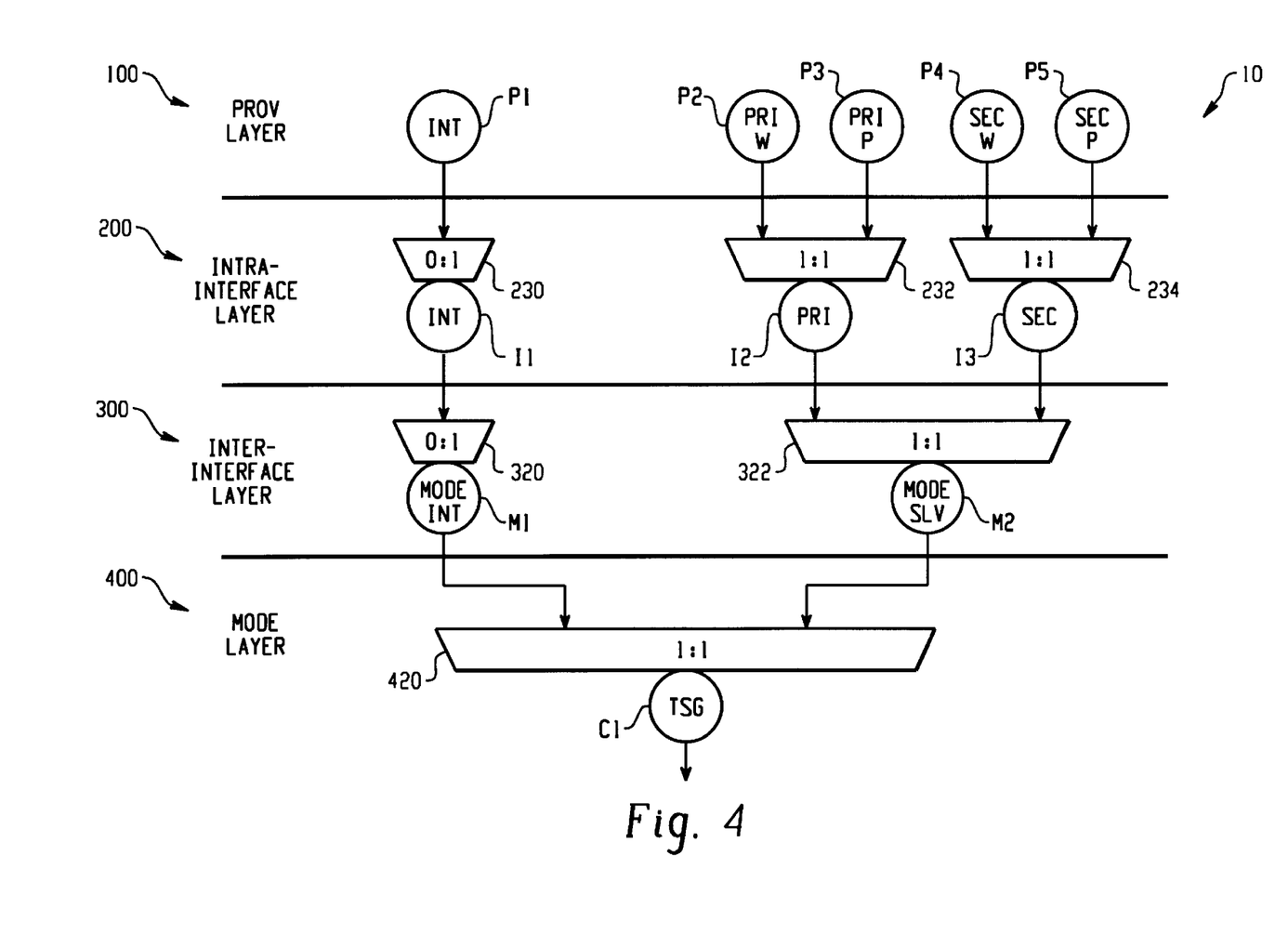
FIG. 4 is a block diagram of a multi-layer control interface in a Timing Signal Generator (TSG)

FIG. 4 is a block diagram of a multi-layer control interface 10 in a Timing Signal Generator (TSG). In the TSG, the clock C1 is selected from among five access point clocks—Internal P1, Primary Working P2, Primary Protection P3, Secondary Working P4, and Secondary Protection P5. The intra-interface layer 200 provides line protection and groups the clocks P1–P5 from the provisioning layer 100 into a plurality of switching elements 230, 232 and 234. The respective outputs of the switching elements 230, 232 and 234 are interface clocks Internal I1, Primary I2, and Secondary I3.

The inter-interface layer 300 receives the interface clocks I1–I3 and groups them into switching elements 320 and 322. The respective outputs of the switching element 320 and 322 are mode clocks Internal M1 and Slave M2. The mode layer 400 receives the mode clocks M1 and M2 outputs a TSG clock that is one of the mode clocks M1 or M2.

The multi-layer control interface 10 for the TSG thus supports two modes of operation: Internal clock M1 and Slave clock M2. The Slave clock M2 is selected from two different interface clocks Primary I2 and Secondary I3, and the Internal clock M1 is the Internal clock P1. Illustratively, the Internal clock P1 is provided by an ST3E oscillator. Thus, there are four protection schemes in excess of 0:1: two 1:1 schemes for Interface clocks I1 and I2, one 1:1 scheme for the Slave clock M2, and one 1:1 scheme for the TSG clock C1.

Figure 5:
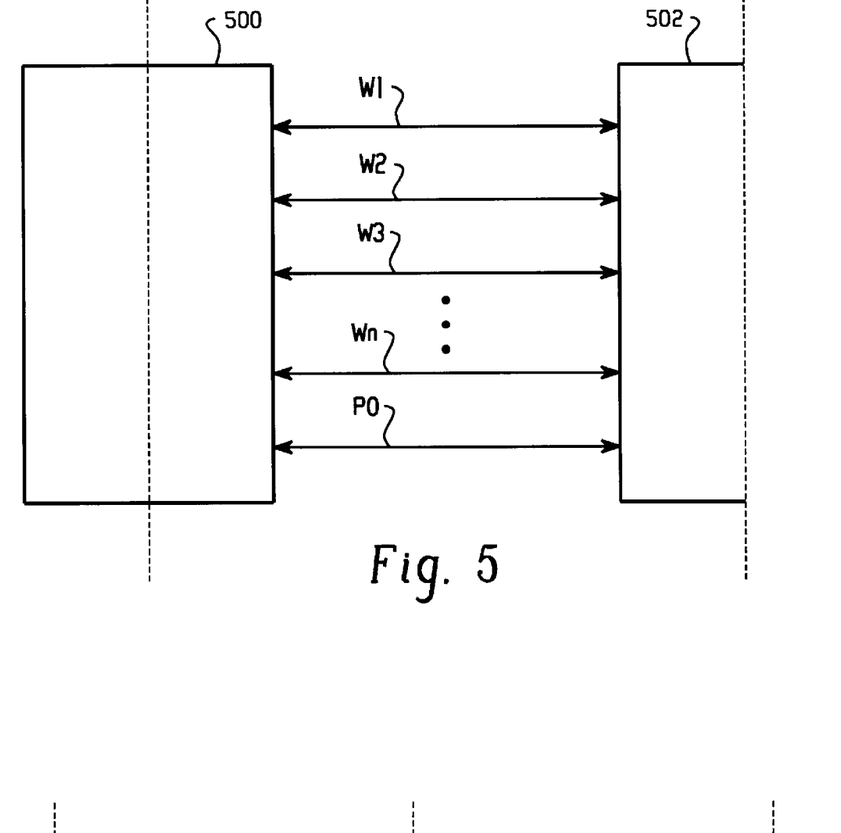
FIG. 5 is a block diagram of a Linear Automatic Protection Switching (APS)/Clock protection scheme embedded in the multi-layer control interface.
Figure 6:
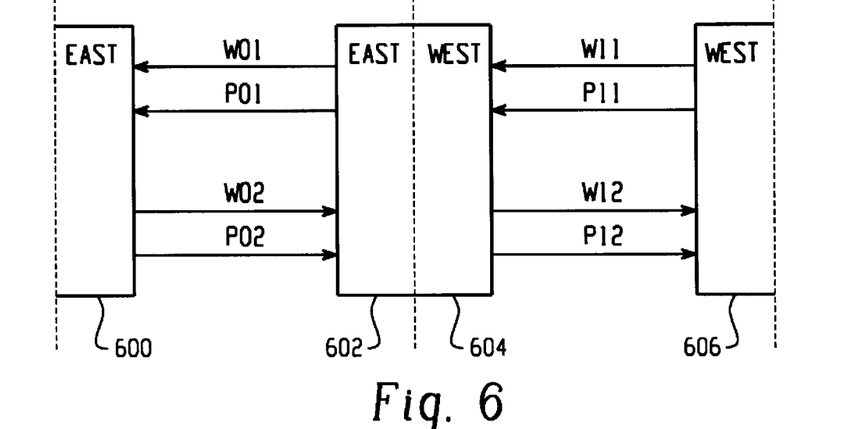
FIG. 6 is a block diagram of a Bidirectional Line Switch Ring (BLSR) 4-Fiber/Clock protection scheme embedded in the multi-layer control interface.

FIGS. 5 and 6 are block diagrams respectively illustrating how a Linear APS/Clock protection scheme and a BLSR 4-Fiber/Clock protection scheme are embedded in the multi-layer control interface 10.

In the Linear APS/Clock protection scheme depicted in FIG. 5, the communication element is operable to detect a failed working line and switch to a protection line. The protection scheme may be 1+1, in which every working line has one protection line, or 1:n, in which every n working lines has one protection line. FIG. 5 depicts a Linear APS 1:n protection scheme, in which the working lines W1, W2, . . . Wn are protected by one protection line P0. The working lines W1, W2, . . . Wn and the protection line P0 connect a pair of line cards 500 and 502. Switching occurs at the line card level, which may be realized by switching at the intra-layer level 200 in the multi-layer control interface 10.

In the BLSR 4-Fiber/Clock protection scheme depicted in FIG. 6, bidirectional communication is established over first and second working lines W01 and W02 between line cards 600 and 602. The first working line W01 transmits data in a first direction, and the second working line W02 transmits data in the second direction. Each first and second working line W01 and W02 is protected by first and second protection lines P01 and P02. Similarly, bidirectional communication is established over first and second working lines W11 and W12 between line cards 602 and 604, and protection is provided by protection lines P11 and P12.

The BLSR 4-Fiber protection scheme provides both span protection and ring protection. Span protection protects the span between two network elements. For example, if the lines W01 and W02 fail, communication continues over the protection lines P01 and P02. Switching occurs at the line card level, which may be realized by switching at the intra-layer level 200 in the multi-layer control interface 10.

Ring protection protects a network ring if both the working lines and the protection lines between two network elements fail. For example, if the lines W01, W02, P02 and P02 fail, then the network ring is protected by activating the protection lines P11 and P12 in conjunction with the working lines W11 and W12. Switching occurs above the line card level, and may be realized as switching at the inter-layer level 300 in the multi-layer control interface 10.

Figure 7:
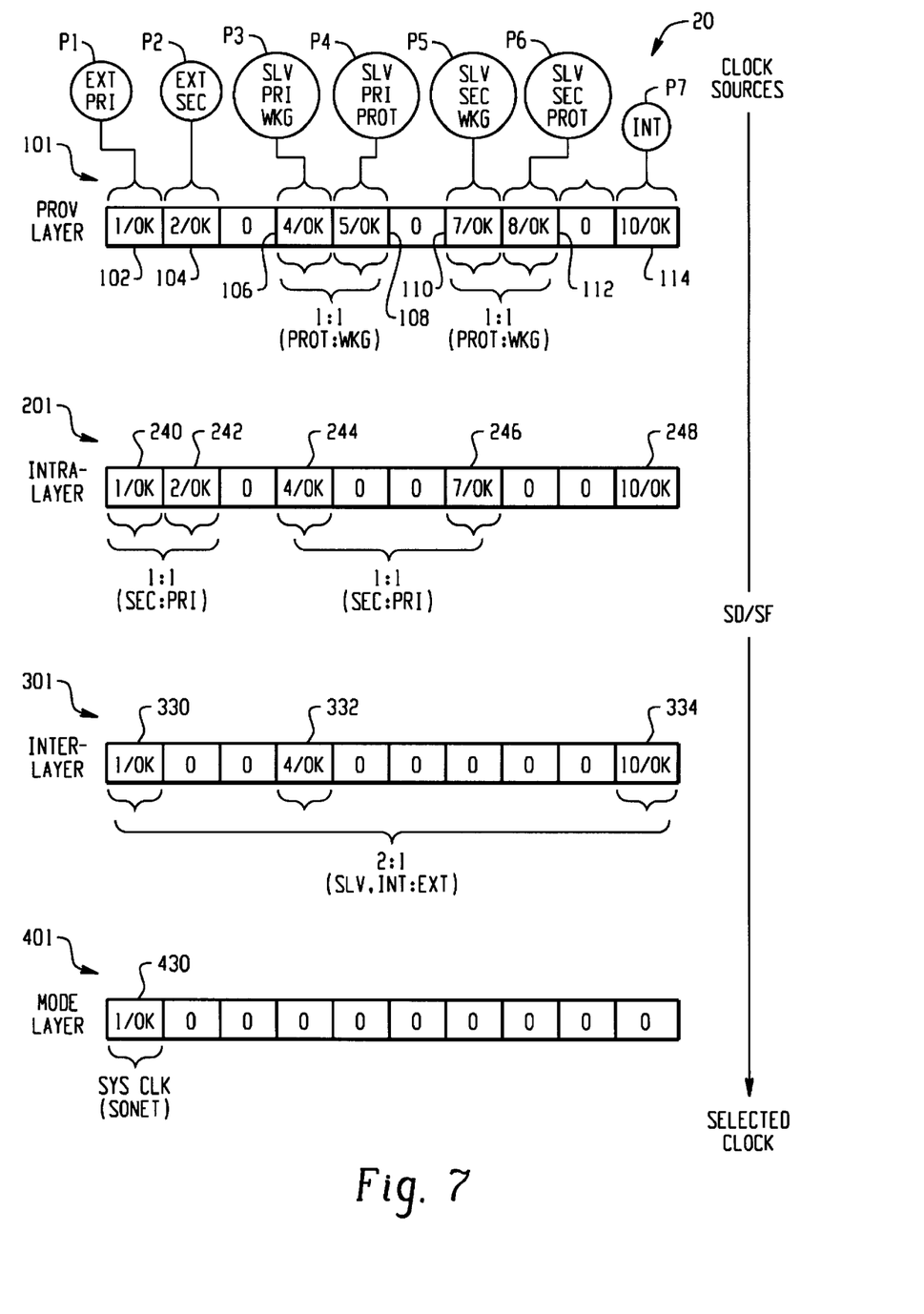
FIG. 7 is a matrix architecture for the multi-layer control interface for clock switching.

FIG. 7 is a matrix architecture for the multi-layer control interface 10 for clock switching. The cells of the matrix 20 are each associated with a corresponding clock. The matrix architecture may be implemented in either a hardware device or software program, or a combination of both a hardware device and an associated software program. The cells may correspond to a specific memory location in the hardware device, or a location in a data structure in a software program, or to other reference means by which a clock may be associated.

Each cell of the matrix 20 contains two values: the corresponding clock identifier (1, 2, . . . n) and the quality of the clock. The quality of the clock is illustratively an OK state, or states associated with Signal Degradation (SD), or Signal Failure (SF). Other quality indicators or classifications may also be used.

The matrix 20 of FIG. 7 is illustratively used for selecting a SONET system clock C1. The matrix 20 is provided two external sources—External Primary P1 and External Secondary P2; four slave sources—Slave Primary Working P3, Slave Primary Protect P4, Slave Secondary Working P5, and Slave Secondary Protect P6; and one internal source Internal P7. The user may select between External, Slave and Internal mode.

The first layer 101 includes a plurality of cells 102, 104, 106, 108, 110, 112 and 114 that store clock identifier data for corresponding clocks P1–P7, and clock quality data indicating the quality of the clock signal for the corresponding clock. For example, cell 102 stores clock identifier data "1" and clock quality data "OK," thus indicating that the clock identified by cell 102, which is the External Primary clock P1, has an OK status. Cells 104, 106, 108, 110, 112 and 114 likewise store clock identifier data and clock quality data for clocks P2–P7 from the provisioning layer 100.

A 0 (zero) identifier indicates that no clock has been associated with the cell, and thus the cell is unallocated. Thus, as additional clocks are added, an unallocated cell may be associated with the additional clock. Likewise, if a clock is removed, the corresponding cell may then be unallocated.

The cells of the second layer 201 of the matrix 20 are initialized with the data from cells in the first layer 101. A cell in the second layer 201 stores data from one cell in the first layer 101 according to a protection scheme. Each allocated cell in the second layer 201 corresponds to a group output clock. For example, cells 240 and 242 store data from cells 102 and 104, respectively. Thus, the second layer 201 provides a 0:1 protection scheme for the clocks associated with cells 240 and 242, i.e., cell 240 corresponds to the group output clock for cell 102, and cell 242 corresponds to the group output clock for cell 104. Similarly, cell 244 stores data from one of the cells 106 and 108. Thus, the second layer 201 provides a 1:1 protection scheme for the clock associated with cell 244, i.e., cell 244 corresponds to the group output clock for the clocks associated with cells 106 and 108.

The second layer 201 may be further configured to detect the clock quality of each clock associated with the cells 240, 242, 244, 246 and 248, and thus each cell may update the clock quality data it receives from the first layer 101. For example, if the second layer 201 detects that the clock referenced by cell 246, which is the Slave Secondary clock P5, is in an out of range (OOR) status, the clock quality data may be updated from OK to OOR. The update in the second layer 201 may occur independent of detection of the status in the first layer 101.

If a 1:1 or greater protection scheme is implemented for a group output clock corresponding to a cell in the second layer 201, the second layer 201 may be further configured to change the corresponding clock identifier data and clock quality data in the cell to switch to a protection clock in the event of a signal failure or signal degradation.

The cells of the third layer 301 of the matrix 20 are initialized with the data from the cells in the second layer 201. A cell in the third layer 301 stores data from one cell in the second layer 201 according to a protection scheme as described above. For example, cell 330 stores data from one of the cells 240 and 242; thus, the third layer 301 provides a 1:1 protection scheme for the clock associated with cell 330.

The third layer 301 may be further configured to detect the clock quality status of each clock selected by the cells 330, 332 and 334. Thus the clock quality status data received from the second layer 201 may be updated in each cell, and the clock identifier data and the clock quality data may be changed to switch selected clocks upon detection of a signal failure or signal degradation, as described above.

Cell 430 of the fourth layer 401 of the matrix 20 is initialized with the data from one of the cells 330, 332 and 334 of the third layer 301, and thus provides a 2:1 protection scheme for its associated clock. As illustrated, cell 430 is storing data associated with the External Primary clock P1, and thus the External Primary clock P1 is the selected clock C1.

The fourth layer 401 may be further configured to detect the clock quality status of the clock selected by the cell 430, and thus cell 430 may update the clock quality status data it received from the third layer 301.

Figure 8:
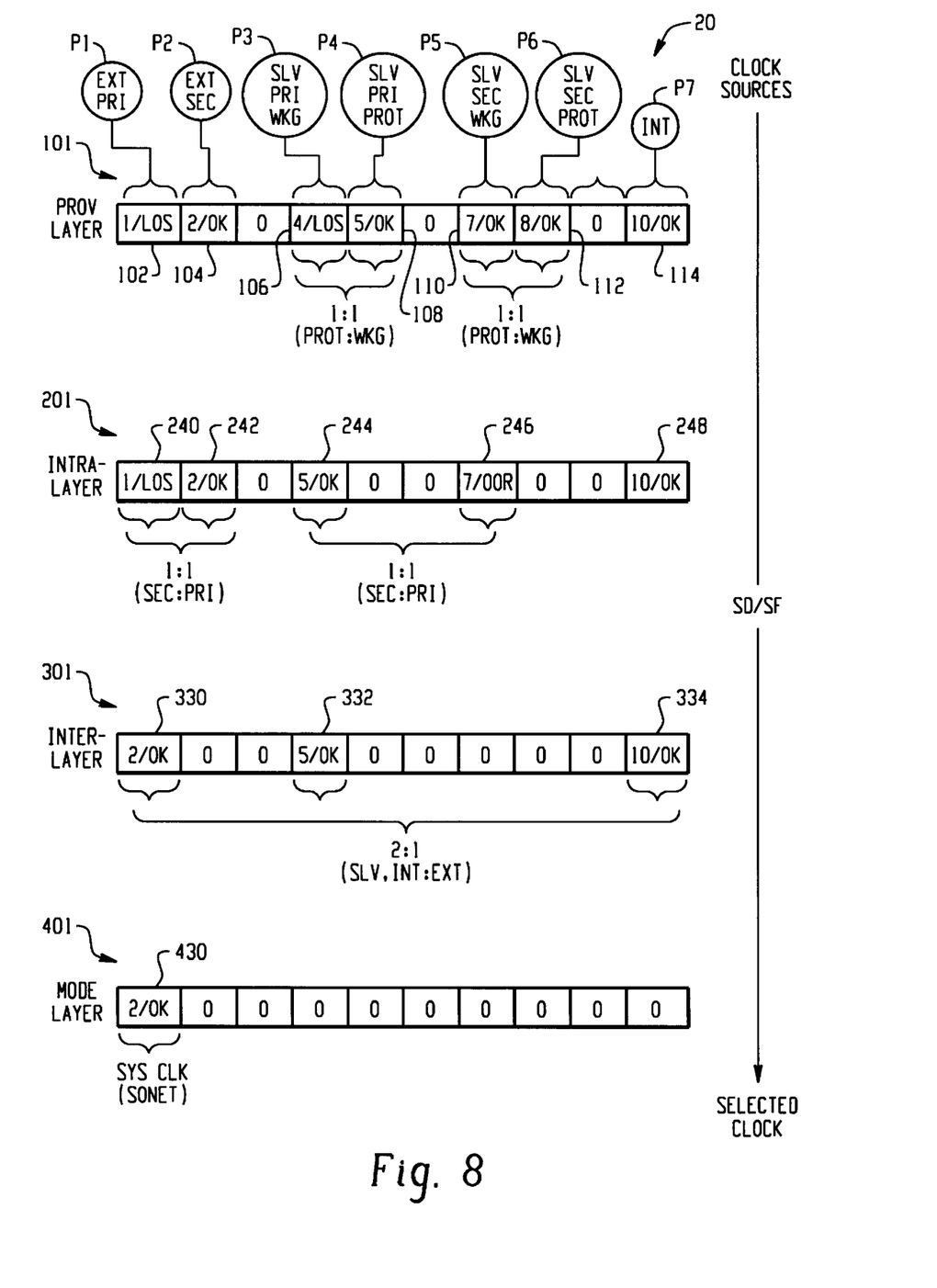
FIG. 8 is the matrix architecture of FIG. 7, including updated clock status.

FIG. 8 shows the matrix architecture of FIG. 7 including updated clock status data, and shows an example of SD/SF propagation through the layers 101, 201, 301 and 401. In the example, the first layer 101 is configured to detect clock signal errors and detects the following errors: Loss of Signal (LOS) for the External Primary P1 and the Slave Primary Working P3. The LOS data is stored in corresponding cells 102 and 106.

The second layer 201 is configured to detect clock signal errors and detects an OOR status in the Slave Secondary Working clock P5. Thus, cell 246 updates the clock quality data from "OK" to "OOR."

Cell 240 receives the LOS error from cell 102, and thus cell 240 also indicates a LOS error for the External Primary clock P1.

Cell 244 initially received the LOS error from cell 106. Because the clock associated with cell 244 is protected by a 1:1 protection scheme, cell 244 is now associated with Slave Primary Protection clock P4.

Similarly, cell 330 initially received the LOS error from cell 240, and is now associated with the External Secondary clock P2. Because the external mode is selected, cell 430 stores the same data as cell 330. Thus, cell 430 is likewise now associated with the External Secondary clock P2, which is now the selected clock.

Each layer 101, 201, 301 and 401 of the matrix 20 of FIGS. 7 and 8 may also be configured to detect certain classes of errors. For example, the first layer 101 may be operable to detect LOS, line alarm indication signals (AIS-L), loss of frame alignment (LOF), DUS and SSM errors; the second layer 201 may not detect any errors, and the third layer 301 may be operable to detect OOR and Reference Fail errors. Other error classes may also be defined and assigned to each layer.

Figure 9:
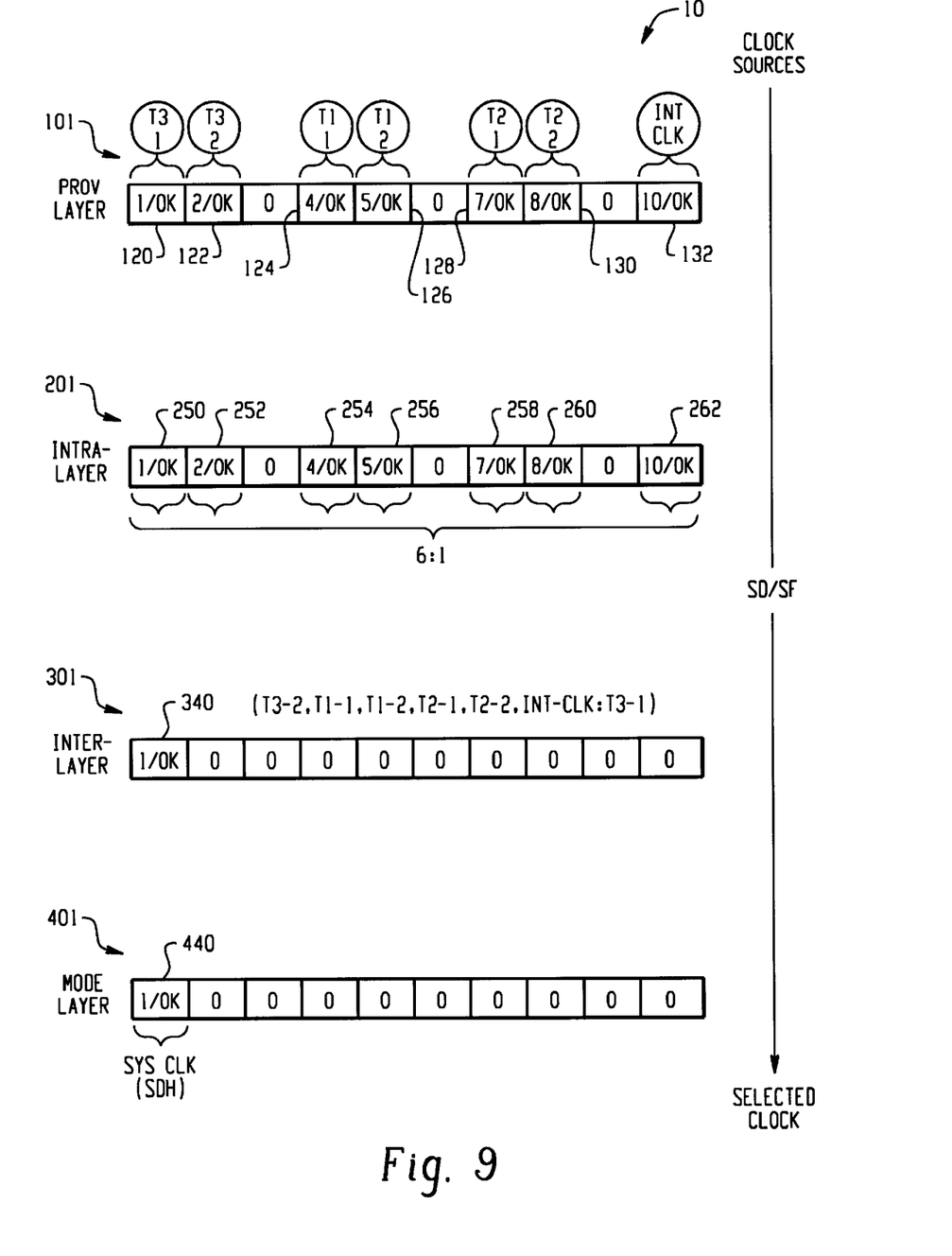
FIG. 9 is a matrix architecture of another embodiment of the multi-layer control interface for clock switching.

FIG. 9 shows an example of a matrix used for an SDH System clock. The matrix references two Synchronous Transfer Module (STM-M) sources T1-1 and T1-2, two Plesiochronous Digital Hierarchy (PDH) sources T2-1 and T2-2, two external sources T3-1 and T3-2 and one internal source INT CLK in cells 120, 122, 124, 126, 128, 130 and 132. A hierarchical list of seven possible clock sources is provided to the second layer 201. Cell 340 in the third layer 301 references the cells 250, 252, 254, 256, 258, 260 and 262, and thus provides a 6:1 protection scheme. Cell 440 receives the clock identifier and clock quality data from cell 340 to provide a selected clock.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A clock system, comprising:
   a provisioning layer operable to arrange a plurality of clock sources into a plurality of input clocks; and
   a plurality of layers arranged according to a hierarchy, the first layer in the hierarchy operable to arrange the input clocks into groups and for each group select a corresponding group output clock, and the remaining layers in the hierarchy operable to arrange the group output clocks from a next layer higher in the hierarchy into groups and for each group select a corresponding group output clock;
   wherein the lowest layer in the hierarchy is operable to select one of the group output clocks from the next layer higher in the hierarchy as a selected clock.

2. The system of claim 1, wherein each group receives M+1 inputs and provides an M:1 protection scheme.

3. The system of claim 2, wherein each layer comprises a switching matrix.

4. The system of claim 3, wherein each switching matrix comprises a plurality of multiplexers, each multiplexer corresponding to a group in the layer.

5. The system of claim 2, wherein each layer comprises a plurality of cells, the cells operable to store clock identifier data for a corresponding input clock and clock quality data of the corresponding input clock.

6. The system of claim 5, wherein the clock identifier data for a corresponding input clock and clock quality data stored in the cells in the plurality of layers correspond to group output clocks.

7. The system of claim 6, wherein the cells in the plurality of layers are operable to select the group output clocks automatically based on the clock quality data.

8. The system of claim 1, wherein the plurality of layers comprise an intra-interface layer first in the hierarchy, an inter-interface interface layer second in the hierarchy, and a mode layer third in the hierarchy.

9. The system of claim 8, wherein the clocks are synchronous.

10. The system of claim 9, wherein each layer comprises a plurality of cells, the cells operable to store clock identifier data for a corresponding input clock and clock quality data of the corresponding input clock.

11. The system of claim 10, wherein the clock identifier data for a corresponding input clock and clock quality data stored in the cells in the plurality of layers correspond to the group output clocks.

12. The system of claim 11, wherein the intra-interface layer and the inter-interface layer are operable to select the group output clocks automatically based on the clock quality data.

13. The system of claim 11, wherein each layer is operable to detect the clock quality of a clock corresponding to a cell in the layer.

14. The system of claim 9, wherein the group output clocks arranged by the mode layer comprise an internal clock, a slave clock, and an external clock.

15. The system of claim 8, wherein each layer is operable to detect clock errors.

16. The system of claim 15, wherein the clock errors are classified into error classes, and each layer is operable to detect errors of one or more error classes.

17. The system of claim 8, wherein the mode layer is the lowest layer in the hierarchy, and the selection of the selected clock corresponds to clock switching between timing modes.

18. The system of claim 17, wherein the selection of the corresponding group output clocks of the inter-interface layer correspond to clock switching between different line interfaces.

19. The system of claim 18, wherein the selection of the corresponding group output clocks of the intra-interface layer correspond to clock switching inside a Bidirectional Line Switch Ring (BLSR) line interface.

20. The system of claim 18, wherein the selection of the corresponding group output clocks of the intra-interface layer correspond to clock switching inside a Linear Automatic Protection Switching (APS) line interface.

21. The system of claim 1, wherein the first layer in the hierarchy corresponds to a line card level.

22. A clock system, comprising:
 a plurality of input clocks;
 a first layer operable to receive the input clocks, arrange the input clocks into first groups, and for each first group select a first group output clock from one of the input clocks in the first group;
 a second layer operable to receive the first group output clocks from the first layer, arrange the first group output clocks into second groups, and for each second group select a second group output clock from one of the first group output clocks in the second group; and
 a third layer operable to receive the second group output clocks and select one of the second group output clocks as a selected clock.

23. The system of claim 22, wherein each group receives M+1 inputs and provides an M:1 protection scheme.

24. The system of claim 23, wherein each layer comprises a switching matrix.

25. The system of claim 24, wherein each switching matrix comprises a plurality of multiplexers, each multiplexer corresponding to a group in the layer.

26. The system of claim 23, wherein each layer comprises a plurality of cells, the cells operable to store clock identifier data for a corresponding input clock and clock quality data of the corresponding input clock.

27. The system of claim 26, wherein the clock identifier data for a corresponding input clock and clock quality data stored in the cells correspond to group output clocks.

28. The system of claim 27, wherein the first and second layers are operable to select the group output clocks automatically based on the clock quality data.

29. The system of claim 28, wherein the input clocks are synchronous.

30. The system of claim 28, wherein each layer is operable to detect the clock quality of a clock corresponding to a cell in the layer.

* * * * *